United States Patent
Lee et al.

(10) Patent No.: US 10,700,717 B1
(45) Date of Patent: Jun. 30, 2020

(54) BAND SELECTION SWITCH CIRCUIT AND AMPLIFIER

(71) Applicant: Samsung Electro-Mechanics Co., Ltd., Suwon-si (KR)

(72) Inventors: Geun Yong Lee, Suwon-si (KR); Hyeon Seok Hwang, Suwon-si (KR); Sun Hong Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/502,116

(22) Filed: Jul. 3, 2019

(30) Foreign Application Priority Data

Mar. 19, 2019 (KR) .......................... 10-2019-0031404

(51) Int. Cl.
| | |
|---|---|
| *H04B 1/00* | (2006.01) |
| *H04B 1/401* | (2015.01) |
| *H04B 1/44* | (2006.01) |
| *H04B 1/16* | (2006.01) |

(52) U.S. Cl.
CPC ......... *H04B 1/0067* (2013.01); *H04B 1/1638* (2013.01); *H04B 1/401* (2013.01); *H04B 1/44* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,795,968 B1 * | 9/2010 | Li | ............................ | H03F 1/223 330/129 |
| 10,027,287 B1 * | 7/2018 | Ichitsubo | ................ | H03F 3/195 |
| 2012/0188011 A1 * | 7/2012 | Retz | ....................... | H03F 1/0277 330/144 |
| 2014/0235184 A1 * | 8/2014 | Ichitsubo | ............. | H04B 1/0067 455/101 |
| 2015/0018043 A1 * | 1/2015 | Taniuchi | ................... | H03H 7/38 455/561 |
| 2015/0091649 A1 * | 4/2015 | Jeon | .......................... | H03F 3/24 330/284 |
| 2016/0050665 A1 * | 2/2016 | Chang | ...................... | H04L 5/001 370/280 |

(Continued)

FOREIGN PATENT DOCUMENTS

| | | |
|---|---|---|
| KR | 10-2014-0030627 A | 3/2014 |
| KR | 10-2015-0143101 A | 12/2015 |
| KR | 10-2018-0058807 A | 6/2018 |

OTHER PUBLICATIONS

Korean Office Action dated Feb. 5, 2020 in corresponding Korean Patent Application No. 10-2019-0031404 (5 pages in English, 4 pages in Korean).

*Primary Examiner* — Cindy Trandai (74) *Attorney, Agent, or Firm* — NSIP Law (57) ABSTRACT

A band selection switch circuit for an amplifier with an impedance matching circuit includes a band selection switch and an impedance compensation circuit. The band selection switch includes a signal port switch configured to selectively connect to one of a common transmit port, transmit and receive (TxRx) ports, and receive ports, and an impedance port switch configured to selectively connect the common transmit port and one of the receive ports and an impedance port. The impedance compensation circuit includes an impedance element connected to the impedance port.

16 Claims, 5 Drawing Sheets

(56) References Cited

U.S. PATENT DOCUMENTS

| | | | |
|---|---|---|---|
| 2016/0116525 A1* | 4/2016 | Nobbe | H03F 3/19 |
| | | | 324/537 |
| 2016/0226552 A1* | 8/2016 | Jin | H04B 1/525 |
| 2016/0241208 A1* | 8/2016 | Lehtola | H03F 1/22 |
| 2016/0380652 A1* | 12/2016 | Anthony | H04B 1/0057 |
| | | | 375/295 |
| 2016/0381649 A1* | 12/2016 | Anthony | H04L 5/001 |
| | | | 455/127.2 |
| 2017/0117358 A1* | 4/2017 | Kim | H01L 21/76898 |
| 2017/0133989 A1 | 5/2017 | Dykstra et al. | |
| 2017/0302236 A1* | 10/2017 | Oshita | H03F 1/56 |
| 2017/0338839 A1* | 11/2017 | Little | H04B 1/56 |
| 2018/0109274 A1 | 4/2018 | Takenaka | |
| 2018/0131501 A1* | 5/2018 | Little | H04B 1/0064 |
| 2018/0138893 A1* | 5/2018 | Caron | H03H 9/725 |
| 2018/0138927 A1* | 5/2018 | Nagumo | H04B 1/006 |
| 2018/0152945 A1* | 5/2018 | Balteanu | H04L 5/1469 |
| 2018/0227006 A1* | 8/2018 | Yasuda | H04B 1/006 |
| 2019/0140669 A1* | 5/2019 | Aikawa | H04B 1/0458 |
| 2019/0190548 A1* | 6/2019 | Chang | H04L 5/001 |
| 2020/0059929 A1* | 2/2020 | Jones | H04W 72/0453 |

\* cited by examiner

BAND SELECTION SWITCH CIRCUIT AND AMPLIFIER

CROSS-REFERENCE TO RELATED APPLICATION(S)

This application claims the benefit under 35 USC 119(a) of Korean Patent Application No. 10-2019-0031404 filed on Mar. 19, 2019 in the Korean Intellectual Property Office, the entire disclosure of which is incorporated herein by reference for all purposes.

BACKGROUND

1. Field

The present disclosure relates to a band selection switch circuit and an amplifier.

2. Description of Related Art

Generally, an amplifier applied to a communications system processing a plurality of communication bands may include a band selection switch. Communication bands may be classified into a high band (HB) power class 2 (PC2) and a low band (LB) power class 3 (PC3) based on the power needed.

The high band power class 2 (PC2) is an LTE power standard that received a 3GPP certificate in 2016 to improve the 2.5 GHz long term evolution time division duplex (LTE TDD) communication range. As higher power is generally required to transmit a transmission signal of a mobile device even further, the high band power class 2 (PC2) has become a new standard.

As for the low band (LB) power class 3 (PC3), the standard in conventional communication systems where power is limited to around 23 dBm between a portable device and a repeater in band 41, the high band (HB) power class 2 (PC2) that requires 26 dBm or higher power, which is twice the maximum power of the low band (LB) power class 3 (PC3), has been defined as a new standard in the 3rd generation partnership project (3GPP). The increase of output power of the high band (HB) power class 2 (PC2) may compensate for transfer loss of a higher time division duplex (TDD) frequency band and may allow cell coverage to be maintained without establishing new infrastructure.

A general amplifier circuit that processes both of the high band power class 2 (PC2) and the low band power class 3 (PC3) may include an amplifier circuit, an impedance matching circuit, and a band selection switch. However, as a maximum power required for the high band power class 2 (PC2) is different from that of the low band power class 3 (PC3), load impedances also need to be different.

Since, in a general load matching circuit, capacitance value and an inductance value are typically fixed to match one of the high band power class 2 (PC2) and the low band power class 3 (PC3), impedances of the different power classes may not be appropriately matched.

A specification that may be required for an amplifier (e.g., a PAM) is a voltage standing wave ratio (VSWR) of a receive port (RX port), which may vary for different customers, and may have a strict standard (e.g., VSWR<1.5:1). Since a band selection switch may include a plurality of transistors (TR), and each transistor may have parasitic capacitance and may also have parasitic capacitance of an RF feed line of an amplifier, a mismatch appearing in a receive port (Rx port) may increase, which may decrease a VSWR or may cause a mismatch loss.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a band selection switch circuit for an amplifier with an impedance matching circuit includes a band selection switch and an impedance compensation circuit. The band selection switch includes a signal port switch configured to selectively connect to one of a common transmit port, transmit and receive (TxRx) ports, and receive ports, and an impedance port switch configured to selectively connect the common transmit port and one of the receive ports and an impedance port. The impedance compensation circuit includes an impedance element connected to the impedance port.

The impedance port switch may be configured to be in an off-state in a first power mode and interlocked with the selective connection of the signal port switch in a second power mode. Power of the second power mode may be lower than power of the first power mode.

The impedance port switch may be configured to selectively connect the impedance port to a respective port selected by the signal port switch in the second power mode.

The signal port switch may include a first signal switch connected between the common transmit port and a first TxRx port of the TxRx ports, a second signal switch connected between the common transmit port and a second TxRx port of the TxRx ports, a third signal switch connected between the common transmit port and a third TxRx port of the TxRx ports, a fourth signal switch connected between the first TxRx port and a first receive port of the receive ports, and a fifth signal switch connected between the second TxRx port and a second receive port of the receive ports.

The impedance port switch may include a first impedance switch connected between the impedance port and the common transmit port, a second impedance switch connected between the impedance port and the first receive port, and a third impedance switch connected between the impedance port and the second receive port.

The first impedance switch may be configured to be in an on-state upon the first signal switch being in an on-state during the second power mode. The second impedance switch may be configured to be in an on-state upon the fourth signal switch being in an on-state during the second power mode. The third impedance switch may be configured to be in an on-state upon the fifth signal switch being in an on-state during the second power mode.

The impedance element may be an inductance element having an inductance value determined based on relevant communication bands.

In another general aspect, an amplifier includes a transmit amplifier circuit, an impedance matching circuit selectively connected to the transmit amplifier circuit, a band selection switch, and an impedance compensation circuit. The band selection switch includes a signal port switch configured to selectively connect to one of a common transmit port, transmit and receive (TxRx) ports, and receive ports, and an impedance port switch configured to selectively connect the common transmit port and one of the receive ports and an impedance port. The impedance compensation circuit includes an impedance element connected to the impedance port.

The amplifier may further include a switching control circuit configured to control the signal port switch and the impedance port switch in response to one of plural power modes and one of plural communication bands.

The switching control circuit may be configured to control the impedance port switch to be in an off-state in a first power mode of the plural power modes, and to control the selective connection of the impedance port switch upon being interlocked with the selective connection of the signal port switch in a second power mode of the plural power modes. Power of the second power mode may be lower than power of the first power mode.

The impedance port switch may be configured to be in an off-state in the first power mode, and to operate upon being interlocked with selective connection of the signal port switch in the second power mode.

The impedance port switch may be configured to selectively connect the impedance port to a respective port selected by the signal port switch in the second power mode.

The signal port switch may include a first signal switch connected between the common transmit port and a first TxRx port of the TxRx ports, a second signal switch connected between the common transmit port and a second TxRx port of the TxRx ports, a third signal switch connected between the common transmit port and a third TxRx port of the TxRx ports, a fourth signal switch connected between the first TxRx port and a first receive port of the receive ports, and a fifth signal switch connected between the second TxRx port and a second receive port of the receive ports.

The impedance port switch may include a first impedance switch connected between the impedance port and the common transmit port, a second impedance switch connected between the impedance port and the first receive port, and a third impedance switch connected between the impedance port and the second receive port.

The first impedance switch may be configured to be in an on-state upon the first signal switch being in an on-state during the second power mode. The second impedance switch may be configured to be in an on-state upon the fourth signal switch being in an on-state during the second power mode. The third impedance switch may be configured to be in an on-state upon the fifth signal switch being in an on-state during the second power mode.

The impedance element may be an inductance element having an inductance value determined based on relevant communication bands.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the drawings, the same elements having the same function in the overall descriptions will be described with use of the same reference numeral.

Figure 1:
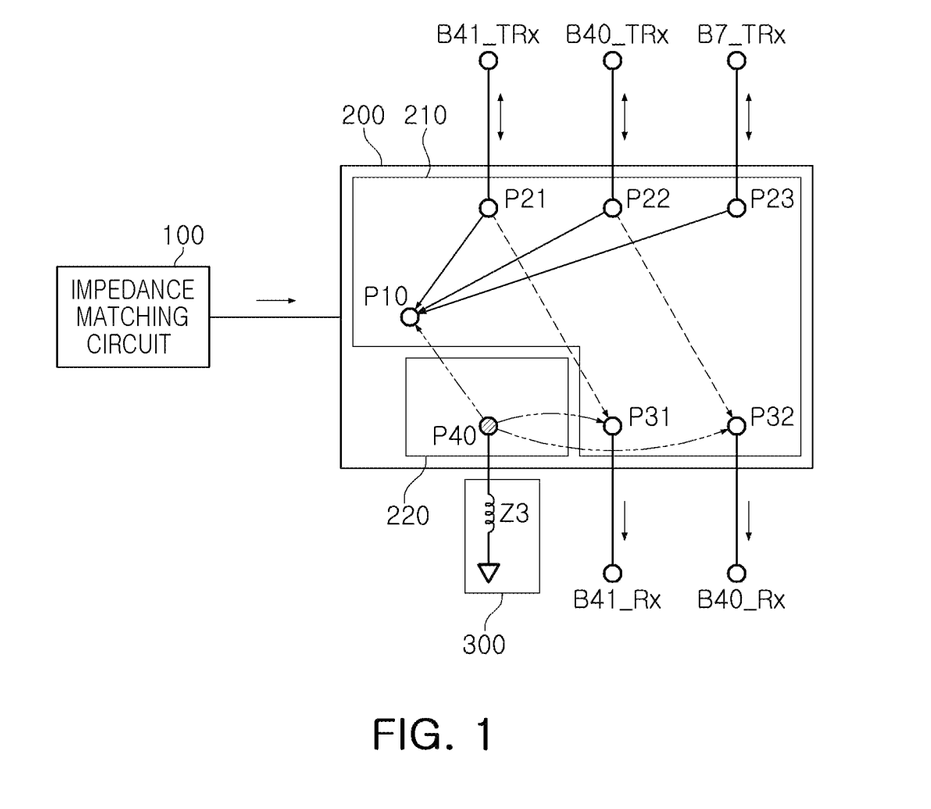
FIG. 1 is a diagram illustrating an example of a band selection switch circuit.
Figure 2:
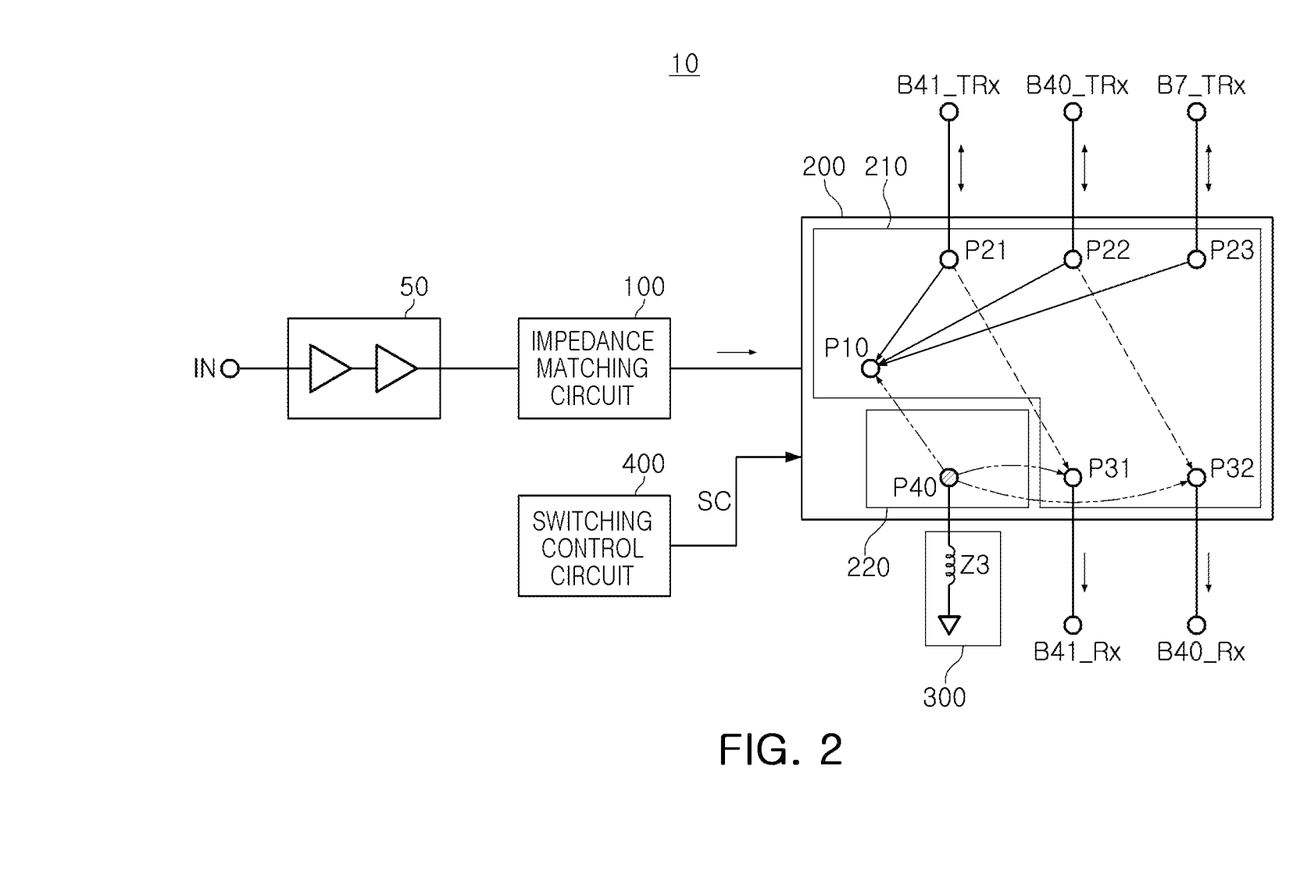
FIG. 2 is a diagram illustrating an example of an amplifier.

FIG. 1 is a diagram illustrating an example of a band selection switch circuit. FIG. 2 is a diagram illustrating an example of an amplifier.

Referring to FIG. 1, a band selection switch circuit may be used in selecting a communication band for an amplifier 10 that has an impedance matching circuit 100.

Referring to FIGS. 1 and 2, the amplifier 10 may include a transmit amplifier circuit 50, an impedance matching circuit 100, a band selection switch 200, and an impedance compensation circuit 300. The amplifier 10 may further include a switching control circuit 400.

The transmit amplifier circuit 50 may be connected between an input terminal IN and the impedance matching circuit 100, and may amplify a radio frequency signal input through the input terminal IN and output the amplified radio frequency signal to the impedance matching circuit 100.

The impedance matching circuit 100 may be connected between the transmit amplifier circuit 50 and the band selection switch 200, and may be configured to perform impedance matching with respect to one of the different power classes, a high band power class 2 (PC2), for example. Accordingly, the impedance matching circuit 100 may perform impedance matching for the high band power class 2 (PC2).

For example, when the amplifier with different power classes operates in the high band power class 2 (PC2), impedance matching may be properly performed, and when the power class is changed to a low band power class 3 (PC3), impedance compensation may be performed to correspond to the low band power class 3 (PC3) by switching the band selection switch 200 and the impedance compensation circuit 300.

The switching control circuit 400 may control a signal port switch 210 and an impedance port switch 220 in response to a predetermined power mode and a determined communication band. Control operations of the switching control circuit 400 will be further described later.

The band selection switch 200 may include the signal port switch 210 and the impedance port switch 220.

The signal port switch 210 may selectively select a port connection from one of a common transmit port P10, a plurality of transmit and receive (TxRx) ports P21, P22, and P23, and a plurality of receive ports P31 and P32, connected to the matching circuit 100, in response to control of the switching control circuit 400. As an example, the common transmit port P10 may be connected to one of the plurality of TxRx ports P21, P22, and P23 or may be connected to one of the plurality of receive ports P31 and P32 by the signal port switch 210.

The impedance port switch 220 may selectively select port connections between the common transmit port P10 and one of the plurality of receive ports P31 and P32, and an impedance port P40. As an example, the impedance port P40 may be selectively connected to the common transmit port P10 or may be connected to one of the plurality of receive ports P31 and P32 by the band selection switch 200.

The impedance compensation circuit 300 may include an impedance element Z3 connected to the impedance port P40. As an example, the impedance element Z3 may be an inductance element having an inductance value predetermined for the relevant communication bands.

As an example, an example in which the amplifier of the example embodiment is applied to a communication device in which a first power mode power class 2 and a second power mode power class 3 are used will be further described.

The switching control circuit 400 may control the impedance port switch 220 to be in an off-state in the first power mode power class 2 when switching between the first power mode power class 2 and the second power mode power class 3.

The switching control circuit 400 may be interlocked with a selecting operation of the signal port switch 210 and may control a selecting operation of the signal port switch 210 in the second power mode power class 3, which has a lower power than the power of the first power mode power class 2.

In response to control of the switching control circuit 400, the impedance port switch 220 may be in an off-state in the first power mode power class 2, and may operate while being interlocked with a selecting operation of the signal port switch 210 in the second power mode power class 3, which has a lower power than the power of the first power mode power class 2.

For example, the impedance port switch 220 may allow the impedance port P40 to be connected to a respective port selected by the signal port switch 210 in the second power mode power class 3 in which power is lower than the power of the first power mode power class 2. The configuration will be further described with reference to FIG. 3.

With respect to the drawings, unnecessary overlapping descriptions of the elements denoted by the same reference numeral and having the same function will not be provided, and differences between the drawings will be described.

Figure 3:
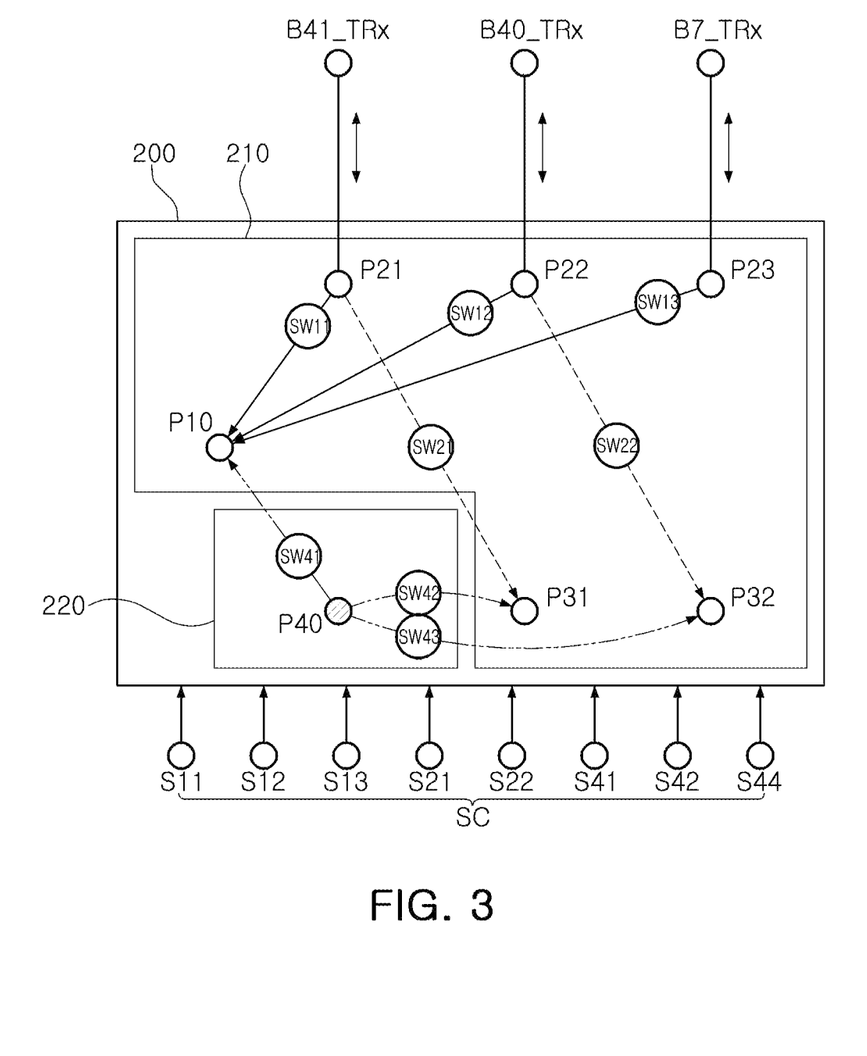
FIG. 3 is a diagram illustrating an example of an impedance compensation circuit.

FIG. 3 is a diagram illustrating an example of an impedance compensation circuit.

Referring to FIG. 3, a signal port switch 210 may include a first signal switch SW11, a second signal switch SW12, a third signal switch SW13, a fourth signal switch SW31, and a fifth signal switch SW32.

The first signal switch SW11 may be selectively connected between a first TxRx port P21 of a plurality of TxRx ports P21, P22, and P23 and a common transmit port P10.

The second signal switch SW12 may be selectively connected between a second TxRx port P22 of the plurality of TxRx ports P21, P22, and P23 and the common transmit port P10.

The third signal switch SW13 may be selectively connected between a third TxRx port P23 of the plurality of TxRx ports P21, P22, and P23 and the common transmit port P10.

The fourth signal switch SW31 may be selectively connected between a first receive port P31 of a plurality of receive ports P31 and P32 and the first TxRx port P21.

The fifth signal switch SW32 may be selectively connected between a second receive port P32 of the plurality of receive ports P31 and P32 and the second TxRx port P22.

The impedance port switch 220 may include a first impedance switch SW41, a second impedance switch SW42, and a third impedance switch SW43.

The first impedance switch SW41 may be connected between an impedance port P40 and the common transmit port P10.

The second impedance switch SW42 may be connected between the impedance port P40 and the first receive port P31.

The third impedance switch SW43 may be connected between the impedance port P40 and the second receive port P32.

A switching control circuit 400, as depicted in FIG. 2 for example, may control the first signal switch SW11, the second signal switch SW12, the third signal switch SW13, the fourth signal switch SW21, and the fifth signal switch SW22 using first to fifth control signals S11, S12, S13, S21, and S22, respectively.

The switching control circuit 400 may also control the first impedance switch SW41, the second impedance switch SW42, and the third impedance switch SW43 using seventh, eighth, and ninth control signals S41, S42, and S43.

For example, when the switching control circuit 400 controls the first signal switch SW11 to be in an on-state during a second power mode power class 3, the switching control circuit 400 may be interlocked with the control operation and may control the first impedance switch SW41 to be in an on-state.

Also, when the switching control circuit 400 controls the fourth signal switch SW21 to be in an on-state during the second power mode power class 3, the switching control circuit 400 may be interlocked with the control operation and may control the second impedance switch SW42 to be in an on-state.

When the switching control circuit 400 controls the fifth signal switch SW22 to be in an on-state during the second power mode power class 3, the switching control circuit 400 may be interlocked with the control operation and may control the third impedance switch SW43 to be in an on-state.

In accordance with the control operation of the switching control circuit 400, the first impedance switch SW41 may be in an on-state when the first signal switch SW11 is in an on-state during the second power mode power class 3.

In accordance with the control operation of the switching control circuit 400, the second impedance switch SW42 may be in an on-state when the fourth signal switch SW21 is in an on-state during the second power mode power class 3.

In accordance with the control operation of the switching control circuit 400, the third impedance switch SW43 may be in an on-state when the fifth signal switch SW22 is in an on-state during the second power mode power class 3.

Accordingly, in response to the control operation of the switching control circuit 400, the impedance port switch 220 may be in an off-state in the first power mode power class 2, and may be interlocked with a port connecting operation of the signal port switch 210 and may perform a connecting operation to a respective port for impedance compensation in the second power mode power class 3.

As an example, the first TxRx port P21 of the plurality of TxRx ports P21, P22, and P23 may be B41_TRx, the second TxRx port P22 may be B40_TRx, and the third TxRx port P23 may be B7_TRx, for example.

The first receive port P31 of the plurality of receive ports P31 and P32 may be B41_Rx, and the second receive port P32 may be B40_Rx.

In accordance with the above-described impedance compensation operation, impedance properties, insertion loss properties, and voltage standing wave ratio properties and an efficiency thereof will improve. The configuration will be described with reference to FIGS. 4, 5, 6, and 7.

Figure 4:
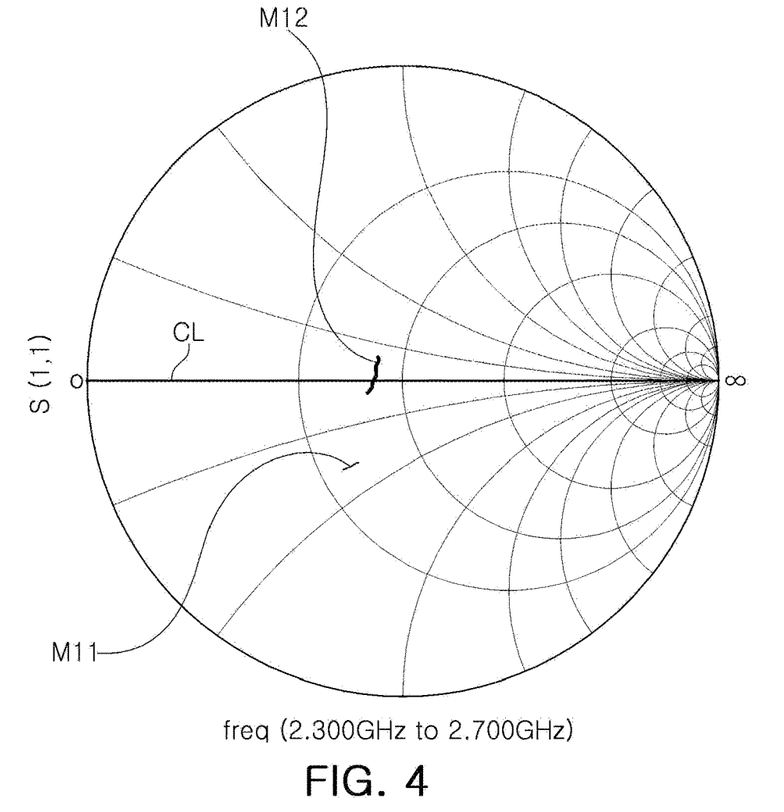
FIG. 4 is a diagram illustrating an example of a Smith chart illustrating impedance characteristics obtained by using an impedance compensation circuit.
Figure 5:
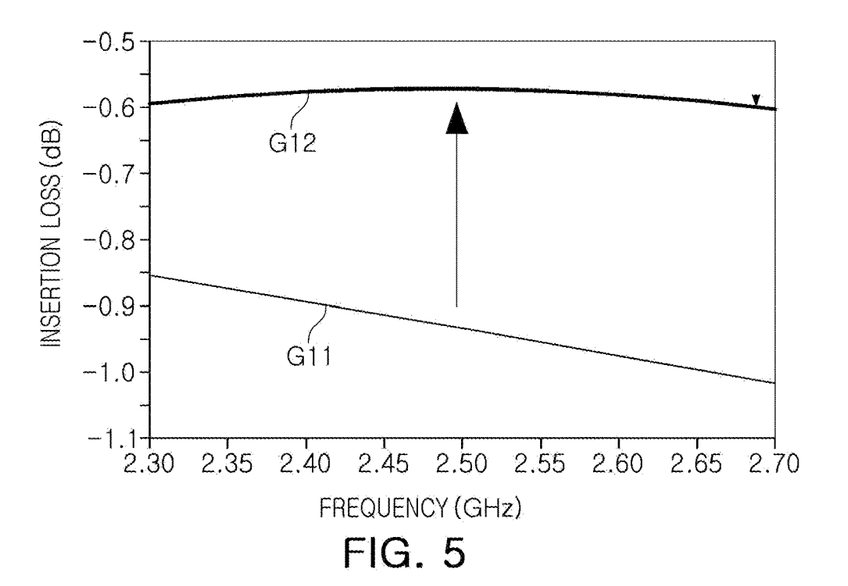
FIG. 5 depicts graphs illustrating insertion loss characteristics obtained by using an impedance compensation circuit.
Figure 6:
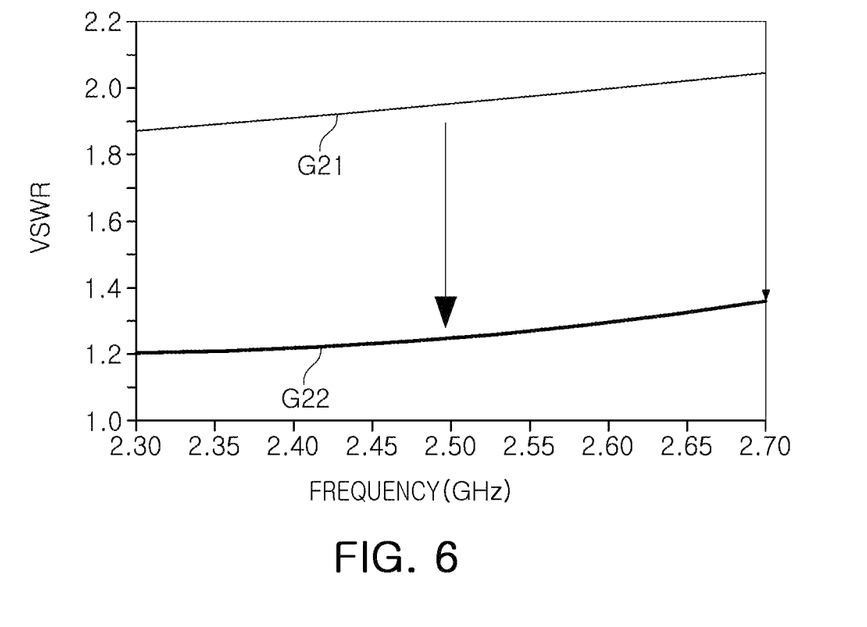
FIG. 6 depicts graphs illustrating voltage standing wave ratio characteristics obtained by using an impedance compensation circuit.
Figure 7:
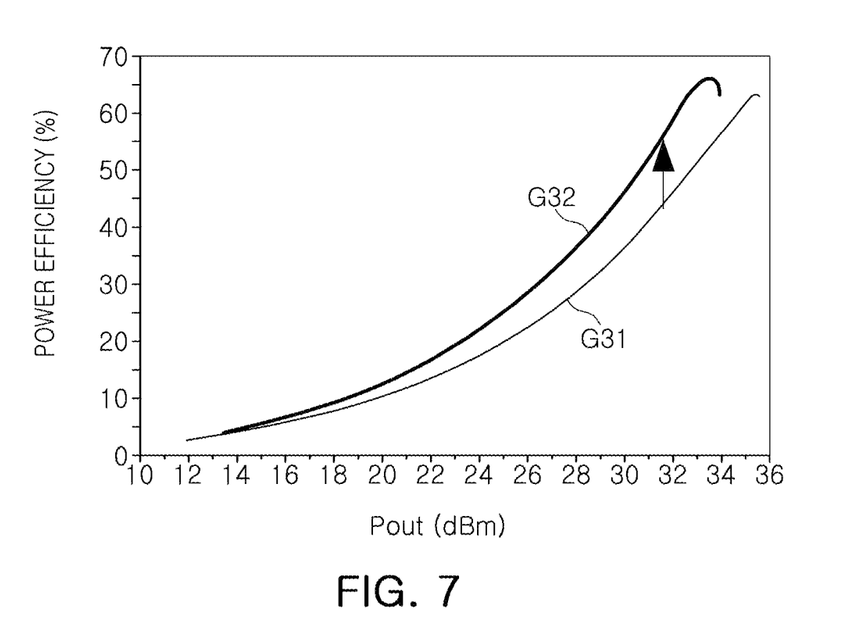
FIG. 7 depicts graphs illustrating efficiency characteristics obtained by using an impedance compensation circuit.

FIG. 4 is a diagram illustrating an example of a Smith chart illustrating impedance characteristics obtained by using an impedance compensation circuit. FIG. 5 depicts graphs illustrating insertion loss characteristics obtained by using an impedance compensation circuit. FIG. 6 depicts graphs illustrating voltage standing wave ratio characteristics obtained by using an impedance compensation circuit. FIG. 7 depicts graphs illustrating efficiency characteristics obtained by using an impedance compensation circuit.

When a first TxRx port P21 B41_TRx is connected to the first receive port P31 B41_Rx as the fourth signal switch SW21 illustrated in FIG. 3 is in an on-state and the second impedance switch SW42 is in an on-state, an impedance port P40 to which an impedance compensation circuit 300 is connected may be connected to a first receive port P31.

In this example, impedance compensation may be performed with respect to the first receive port P31, and performance improvements obtained by the impedance compensation may be further described with reference to FIGS. 4 and 7.

In the Smith chart illustrating impedance characteristics illustrated in FIG. 4, when an impedance point M11 of a general technique in which no impedance compensation is performed is compared to an impedance point M12 of the example embodiment, the impedance point M12 of the example embodiment is closer to a central line CL of the Smith chart, an impedance matching line, than the impedance point M11, which indicates that impedance matching improved in the example embodiment.

In the graphs illustrating insertion loss characteristics illustrated in FIG. 5, when an insertion loss graph G11 of a general technique in which no impedance compensation is performed is compared with an insertion loss graph G12 of the example embodiment, insertion loss in the insertion loss graph G12 of the example embodiment is relatively lower than that of the insertion loss graph G11, which indicates that impedance matching improved in the example embodiment.

In FIG. 6 illustrating a voltage standing wave ratio characteristics, when a voltage standing wave ratio graph G21 of a general technique in which no impedance compensation is performed is compared with a voltage standing wave ratio graph G22 of the example embodiment, impedance matching in the voltage standing wave ratio graph G22 improved.

In the graph illustrating power efficiency characteristics in FIG. 7, when a power efficiency graph G31 of a general technique in which no impedance matching is performed is compared with a power efficiency graph G32 of the example embodiment, the power efficiency (%) is higher in the power efficiency graph G32 of the example embodiment than in the power efficiency graph G31.

The switching control circuit 400 of the amplifier 10 in FIGS. 1-7 may be implemented in a computing environment in which a processor (e.g., a central processor (CPU), a graphic process (GPU), a microprocessor, an application-specific IC (ASIC), a field programmable gate arrays (FPGA), and the like), a memory (e.g., a volatile memory (e.g., a RAM), a non-volatile memory (e.g., an ROM, a flash memory, and the like), an input device (e.g., a keyboard, a mouse, a pen, a voice input device, a touch input device, an infrared camera, a video input device, and the like), an output device (e.g., a display, a speaker, a printer, and the like), and a communication connection device (e.g., a model, a network interface card (NIC), an integrated network interface, a wireless frequency transmitter/receiver, an infrared port, a USB connection device, and the like) are interconnected with one another (e.g., peripheral component interconnect (PCI), USB, firmware (IEEE 1394), an optical bus structure, a network, and the like).

As a non-exhaustive example only, the computing environment as described in FIGS. 1-7 may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

According to the aforementioned example embodiments, impedance compensation may be selectively performed to each of the common transmit port P10 and the plurality of receive ports using a single impedance compensation element (e.g., a mounting component or a transmission line) to compensate for a parasite capacitance value of the amplifier (e.g., a PAM), and accordingly, impedance matching for different power classes may improve.

Also, the example embodiments may be applied to a power amplifying module (HB PAM) of a high band having a relatively high maximum power level, and in this case, by appropriately adjusting impedance in accordance with a changed maximum power level, power efficiency may improve.

Further, the example embodiment may also be applied to an amplifier requiring a relatively high voltage standing wave ratio (VSWR) performance standard, and in this case, respective performance conditions may be satisfied by adjusting impedance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A band selection switch circuit, for an amplifier with an impedance matching circuit, comprising:
    a band selection switch comprising
        a signal port switch configured to selectively connect to one of a common transmit port, transmit and receive (TxRx) ports, and receive ports, and
        an impedance port switch configured to selectively connect the common transmit port and one of the receive ports and an impedance port; and
    an impedance compensation circuit comprising an impedance element connected to the impedance port.

2. The band selection switch circuit of claim 1, wherein the impedance port switch is configured to be in an off-state in a first power mode and interlocked with the selective connection of the signal port switch in a second power mode, wherein power of the second power mode is lower than power of the first power mode.

3. The band selection switch circuit of claim 2, wherein the impedance port switch is configured to selectively connect the impedance port to a respective port selected by the signal port switch in the second power mode.

4. The band selection switch circuit of claim 3, wherein the signal port switch comprises:
    a first signal switch connected between the common transmit port and a first TxRx port of the TxRx ports;
    a second signal switch connected between the common transmit port and a second TxRx port of the TxRx ports;
    a third signal switch connected between the common transmit port and a third TxRx port of the TxRx ports;
    a fourth signal switch connected between the first TxRx port and a first receive port of the receive ports; and
    a fifth signal switch connected between the second TxRx port and a second receive port of the receive ports.

5. The band selection switch circuit of claim 4, wherein the impedance port switch comprises:
    a first impedance switch connected between the impedance port and the common transmit port;
    a second impedance switch connected between the impedance port and the first receive port; and
    a third impedance switch connected between the impedance port and the second receive port.

6. The band selection switch circuit of claim 5,
    wherein the first impedance switch is configured to be in an on-state upon the first signal switch being in an on-state during the second power mode,
    wherein the second impedance switch is configured to be in an on-state upon the fourth signal switch being in an on-state during the second power mode, and
    wherein the third impedance switch is configured to be in an on-state upon the fifth signal switch being in an on-state during the second power mode.

7. The band selection switch circuit of claim 4, wherein the impedance element is an inductance element having an inductance value determined based on relevant communication bands.

8. An amplifier, comprising:
    a transmit amplifier circuit;
    an impedance matching circuit selectively connected to the transmit amplifier circuit;
    a band selection switch comprising
        a signal port switch configured to selectively connect to one of a common transmit port, transmit and receive (TxRx) ports, and receive ports, and an impedance port switch configured to selectively connect the common transmit port and one of the receive ports and an impedance port; and an impedance compensation circuit comprising an impedance element connected to the impedance port.

9. The amplifier of claim 8, further comprising:

a switching control circuit configured to control the signal port switch and the impedance port switch in response to one of plural power modes and one of plural communication bands.

10. The amplifier of claim 9, wherein the switching control circuit is configured to control the impedance port switch to be in an off-state in a first power mode of the plural power modes, and to control the selective connection of the impedance port switch upon being interlocked with the selective connection of the signal port switch in a second power mode of the plural power modes, wherein power of the second power mode is lower than power of the first power mode.

11. The amplifier of claim 10, wherein the impedance port switch is configured to be in an off-state in the first power mode, and to operate upon being interlocked with selective connection of the signal port switch in the second power mode.

12. The amplifier of claim 11, wherein the impedance port switch is configured to selectively connect the impedance port to a respective port selected by the signal port switch in the second power mode.

13. The amplifier of claim 12, wherein the signal port switch comprises:

a first signal switch connected between the common transmit port and a first TxRx port of the TxRx ports;

a second signal switch connected between the common transmit port and a second TxRx port of the TxRx ports;

a third signal switch connected between the common transmit port and a third TxRx port of the TxRx ports;

a fourth signal switch connected between the first TxRx port and a first receive port of the receive ports; and a fifth signal switch connected between the second TxRx port and a second receive port of the receive ports.

14. The amplifier of claim 13, wherein the impedance port switch comprises:

a first impedance switch connected between the impedance port and the common transmit port;

a second impedance switch connected between the impedance port and the first receive port; and a third impedance switch connected between the impedance port and the second receive port.

15. The amplifier of claim 14, wherein the first impedance switch is configured to be in an on-state upon the first signal switch being in an on-state during the second power mode, wherein the second impedance switch is configured to be in an on-state upon the fourth signal switch being in an on-state during the second power mode, and wherein the third impedance switch is configured to be in an on-state upon the fifth signal switch being in an on-state during the second power mode.

16. The amplifier of claim 15, wherein the impedance element is an inductance element having an inductance value determined based on relevant communication bands.

* * * * *